(12) United States Patent
Raghavan et al.

(10) Patent No.: US 10,718,041 B2
(45) Date of Patent: Jul. 21, 2020

(54) SOLID-STATE WELDING OF COARSE GRAIN POWDER METALLURGY NICKEL-BASED SUPERALLOYS

(71) Applicant: United Technologies Corporation, Farmington, CT (US)

(72) Inventors: Ashwin Sreekant Raghavan, South Grafton, MA (US); Kenneth A. Frisk, West Hartford, CT (US); Max A. Kaplan, West Hartford, CT (US); Mario P. Bochiechio, Vernon, CT (US); Michael A. Czywczynski, Plantsville, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 300 days.

(21) Appl. No.: 15/633,659

(22) Filed: Jun. 26, 2017

(65) Prior Publication Data
US 2018/0371594 A1 Dec. 27, 2018

(51) Int. Cl.
*C22F 1/10* (2006.01)
*C21D 10/00* (2006.01)
(Continued)

(52) U.S. Cl.
CPC .............. *C22F 1/10* (2013.01); *B22F 7/062* (2013.01); *B23K 20/12* (2013.01); *B23K 20/129* (2013.01); *B23K 20/233* (2013.01); *B23K 20/24* (2013.01); *B23K 26/0006* (2013.01); *B23K 26/352* (2015.10); *B23K 26/356* (2015.10); *B24B 39/003* (2013.01); *C21D 7/04* (2013.01); *C21D 7/08* (2013.01); *C21D 10/005* (2013.01); *F01D 5/06* (2013.01); *F01D 5/063* (2013.01); *B22F 3/15* (2013.01); *B22F 3/17* (2013.01); *B22F 5/009* (2013.01); *B22F 2998/10* (2013.01); *B22F 2999/00* (2013.01); *B23K 2101/001* (2018.08); *B23K 2103/08* (2018.08);
(Continued)

(58) Field of Classification Search
CPC ......... B23K 20/24; B23K 20/129; C22F 1/10; B22F 7/062
See application file for complete search history.

(56) References Cited

U.S. PATENT DOCUMENTS 4,579,602 A 4/1986 Paulonis et al.
5,111,990 A 5/1992 Thrower et al.
(Continued)

FOREIGN PATENT DOCUMENTS

EP 2359975 A1 8/2011
EP 2530181 A1 12/2012
(Continued)

OTHER PUBLICATIONS

European Search Report dated Jun. 21, 2018 for EP Patent Application No. 18169591.7.

*Primary Examiner* — Colleen P Dunn
*Assistant Examiner* — Sean P. O'Keefe
(74) *Attorney, Agent, or Firm* — Bachman & LaPointe, P.C.

(57) ABSTRACT

A method for welding a first powder metallurgical (PM) part to a second powder metallurgical (PM) part includes: working a first face of the first PM part; working a first face of the second PM part; and friction welding the first face of the first part to the first face of the second part.

19 Claims, 3 Drawing Sheets

(51) Int. Cl.

| | |
|---|---|
| *B23K 20/12* | (2006.01) |
| *C21D 7/04* | (2006.01) |
| *C21D 7/08* | (2006.01) |
| *F01D 5/06* | (2006.01) |
| *B22F 7/06* | (2006.01) |
| *B23K 26/352* | (2014.01) |
| *B23K 26/356* | (2014.01) |
| *B23K 20/24* | (2006.01) |
| *B24B 39/00* | (2006.01) |
| *B22F 5/00* | (2006.01) |
| *C21D 1/26* | (2006.01) |
| *B23K 103/18* | (2006.01) |
| *B23K 26/00* | (2014.01) |
| *B23K 20/233* | (2006.01) |
| *C21D 1/30* | (2006.01) |
| *C22C 1/04* | (2006.01) |
| *B22F 3/15* | (2006.01) |
| *B22F 3/17* | (2006.01) |
| *B23K 101/00* | (2006.01) |
| *B23K 103/08* | (2006.01) |

(52) U.S. Cl.
CPC ............ *B23K 2103/26* (2018.08); *C21D 1/26* (2013.01); *C21D 1/30* (2013.01); *C22C 1/0433* (2013.01); *F05D 2220/32* (2013.01); *F05D 2230/239* (2013.01); *F05D 2230/40* (2013.01); *F05D 2240/61* (2013.01); *F05D 2300/175* (2013.01); *F05D 2300/609* (2013.01)

(56) References Cited

U.S. PATENT DOCUMENTS

| | | | | |
|---|---|---|---|---|
| 5,826,453 | A * | 10/1998 | Prevey, III | ................ B23P 9/02 |
| | | | | 72/75 |
| 8,918,996 | B2 * | 12/2014 | Wessman | ........... B23K 35/3033 |
| | | | | 148/564 |
| 9,156,113 | B2 | 10/2015 | Wessman et al. | |
| 2002/0037219 | A1 * | 3/2002 | Webster | ................... C21D 7/04 |
| | | | | 416/223 R |
| 2004/0005219 | A1 | 1/2004 | Phipps | |
| 2010/0215978 | A1 | 8/2010 | Rice | |
| 2011/0206523 | A1 * | 8/2011 | Konitzer | ............ B23K 20/1205 |
| | | | | 416/213 R |
| 2014/0161618 | A1 | 6/2014 | Walker et al. | |
| 2015/0354358 | A1 | 12/2015 | Grande, III et al. | |
| 2017/0246707 | A1 * | 8/2017 | Bray | ................ B23K 20/1225 |
| 2017/0314401 | A1 | 11/2017 | Schloffer et al. | |
| 2017/0320159 | A1 * | 11/2017 | Lloyd | ................ B23K 35/3046 |

FOREIGN PATENT DOCUMENTS

| | | |
|---|---|---|
| EP | 3208032 A1 | 8/2017 |
| EP | 3238868 A1 | 11/2017 |
| EP | 3309264 A1 | 4/2018 |
| KR | 10-2013-0133365 A | 12/2013 |

* cited by examiner

SOLID-STATE WELDING OF COARSE GRAIN POWDER METALLURGY NICKEL-BASED SUPERALLOYS

U.S. GOVERNMENT RIGHTS

This invention was made with Government support under contract FA8650-09-D-2923-0021 awarded by the United States Air Force. The Government has certain rights in this invention.

BACKGROUND

The disclosure relates to powder metallurgical (PM) nickel-base superalloys. More particularly, the disclosure relates to such superalloys used in high-temperature gas turbine engine components such as turbine and compressor disks and other rotor sections.

The combustion, turbine, and exhaust sections of gas turbine engines are subject to extreme heating as are latter portions of the compressor section. This heating imposes substantial material constraints on components of these sections. One area of particular importance involves blade-bearing turbine disks. The disks are subject to extreme mechanical stresses, in addition to the thermal stresses, for significant periods of time during engine operation.

Exotic materials have been developed to address the demands of turbine disk use. U.S. Pat. No. 4,579,602 (the '602 patent) discloses a nickel-base superalloy and processes for powder metallurgical (PM) manufacture of turbine disks. U.S. Pat. No. 6,521,175 (the '175 patent) discloses a further nickel-base superalloy for PM manufacture of turbine disks. The '175 patent discloses disk alloys optimized for short-time engine cycles, with disk temperatures approaching temperatures of about 1500° F. (816° C.). The disclosures of the '602 and '175 patents are incorporated by reference herein in their entirety as if set forth at length.

US Patent Application Publication 20100008790 (the '790 publication) discloses a nickel-based superalloy having a relatively high concentration of tantalum coexisting with a relatively high concentration of one or more other components. 20130209265 (the '265 publication) discloses a more recent alloy. Other disk alloys are disclosed in U.S. Pat. Nos. 5,104,614, 5,662,749, 6,908,519, EP1201777, and EP1195446. The disclosure of said patents and publications are incorporated by reference herein in their entirety as if set forth at length.

In an exemplary PM process, the powdered alloy is compacted into an initial cylindrical precursor (compact). The compact may be wrought processed to reduce cross-sectional area into a billet for, and subsequently forged to form a forging. The forging may then be machined to clean up features or define features (e.g., disk slots for blade root retention). The forged/machined precursor may be heat treated to precipitation harden to increase strength to optimize overall mechanical strength. The forging may be further machined to a shape more closely resembling the finished part configuration. A peening process may then impart a compressive residual stress to prevent fatigue initiation on the surface (particularly in high-fatigue areas).

Coarse grain Ni-based PM superalloys such as described above are ideal candidates for rotating parts, such as disks and hubs in the hot sections of a gas turbine engine because these materials retain their high strengths and creep capability at elevated temperatures. In many cases, multiple stages need to be joined together. Typical joining comprises a bolt circle through two adjacent components. To improve engine operating efficiencies and to reduce engine weight, it is desirable to shift from bolted configurations. Unfortunately, the factors that make these coarse grain alloys good candidates for elevated temperature applications (retention of strength at elevated temperatures) make them extremely difficult to weld and attain acceptable weld joint properties. Current technology attempts to weld the coarse grain material as is, through pre-heating, and through more controlled direct drive/inertia (hybrid) welding systems. See U.S. Pat. No. 5,111,990. These methods do not alter the microstructure to improve weldability.

SUMMARY

One aspect of the disclosure involves a method for welding a first powder metallurgical (PM) part to a second powder metallurgical (PM) part. The method comprises: working a first face of the first PM part; working a first face of the second PM part; and friction welding the first face of the first part to the first face of the second part.

A further embodiment of any of the foregoing embodiments may additionally and/or alternatively include the working of the first faces of the first PM part and the second PM part being sufficient to achieve enough local compressive residual stress to introduce sufficient strain energy into the part faces prior to welding to refine grain.

A further embodiment of any of the foregoing embodiments may additionally and/or alternatively include heat treatment of the first faces of the first PM part and the second PM part after the working but before the friction welding to reconstitute the grains in the worked zone.

A further embodiment of any of the foregoing embodiments may additionally and/or alternatively include the working of the first faces of the first PM part and the second PM part being sufficient to achieve local compressive residual stress of −30 ksi (−207 MPa) or greater magnitude at 0.050 inch (1.3 mm) deep from the first faces of the first PM part and the second PM part A further embodiment of any of the foregoing embodiments may additionally and/or alternatively include, after the working but before the friction welding, heat treating at least along the first faces of the first PM part and the second PM part.

A further embodiment of any of the foregoing embodiments may additionally and/or alternatively include after the heat treating, along the first surfaces of the first part and the second part there is gamma grain size of ASTM 9 or finer and before the working, along the first surfaces of the first part and the second part there is gamma grain size of ASTM 8 or coarser.

A further embodiment of any of the foregoing embodiments may additionally and/or alternatively include after the working but before the friction welding, heat treating at least along the first faces of the first PM part and the second PM part.

A further embodiment of any of the foregoing embodiments may additionally and/or alternatively include the heat treating comprising localized heat treatment methods.

A further embodiment of any of the foregoing embodiments may additionally and/or alternatively include the working of the first faces of the first part and second part comprising roller burnishing.

A further embodiment of any of the foregoing embodiments may additionally and/or alternatively include the first surfaces of the first part and the second part being annular.

A further embodiment of any of the foregoing embodiments may additionally and/or alternatively include the first PM part and the second PM part being nickel-based superalloy.

A further embodiment of any of the foregoing embodiments may additionally and/or alternatively include the first PM part and the second PM part being gas turbine engine rotor disks.

A further embodiment of any of the foregoing embodiments may additionally and/or alternatively include: working a second face of the second PM part; working a second face of a third powder metallurgical (PM) part; and friction welding the second face of the second part to the second face of the third part.

A further embodiment of any of the foregoing embodiments may additionally and/or alternatively include a rotor manufactured by the process of any of the foregoing embodiments.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
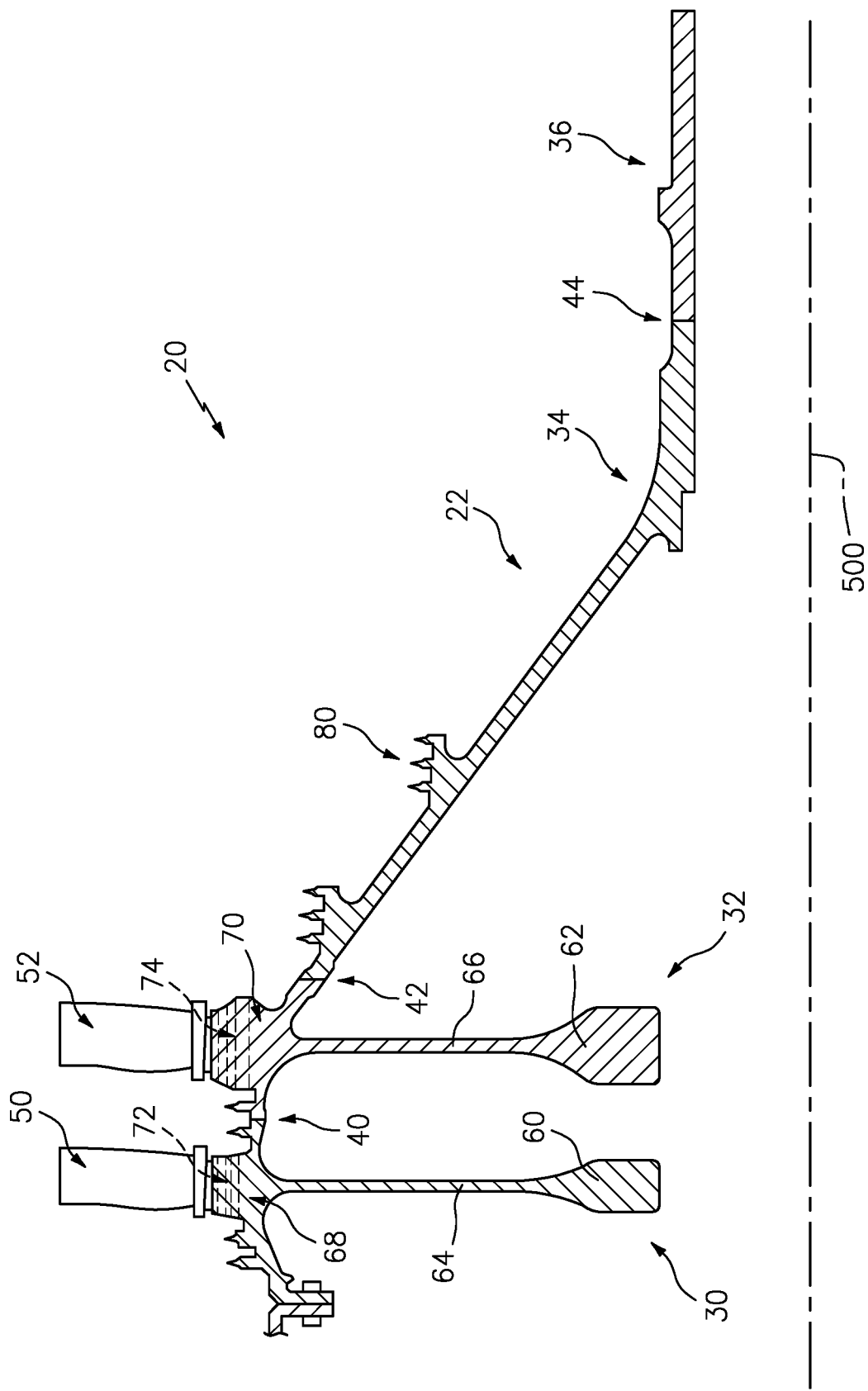
FIG. 1 is a central longitudinal half sectional view of a gas turbine engine rotor.

FIG. 1 shows a gas turbine engine rotor 20. The exemplary rotor is a high pressure compressor (HPC) rotor in a multi spool gas turbine engine. FIG. 1 specifically shows a rotor subassembly 22 comprising four main structural components or parts 30, 32, 34, and 36 secured end to end at weld joints 40, 42, and 44. Each of the components 30, 32, 34, 36 is rotationally symmetric about a central longitudinal axis 500 which forms a centerline of the rotor and engine.

The exemplary first two components 30 and 32 are two blade-carrying disks each carrying a circumferential array of blades 50, 52. The disks each extend from an annular protuberant central bore 60, 62 radially outward along a radial web 64, 66 to an outer rim section 68, 70. The exemplary outer rim sections bear retention slots 72, 74 for retaining respective roots of the associated blades. Alternative disks are pre-formed with the associated blades as an integrally bladed rotor (IBR).

The exemplary third component 34 is a rear hub section and the exemplary fourth component is a shaft section (e.g., which mates with the high pressure turbine (HPT) (not shown)).

The various components may be formed via powder metallurgical (PM) processes as is discussed above and further below. Various of the components may have integrally formed knife edge seal members 80 for interfacing with abradable seals of stationary structure or counter-rotating blade stages. In alternative implementations (not shown), there may be regions for receiving abradable coatings or other abradable material to interface with stationary or counter-rotating knife edges.

Figure 2:
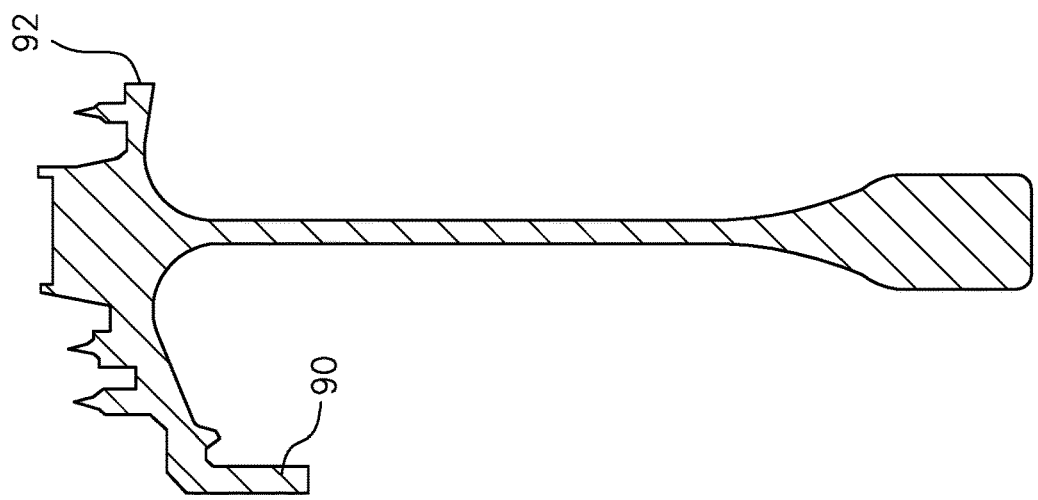
FIG. 2 is a pre-assembly central longitudinal half sectional view of a first disk of the gas turbine engine rotor.
Figure 3:
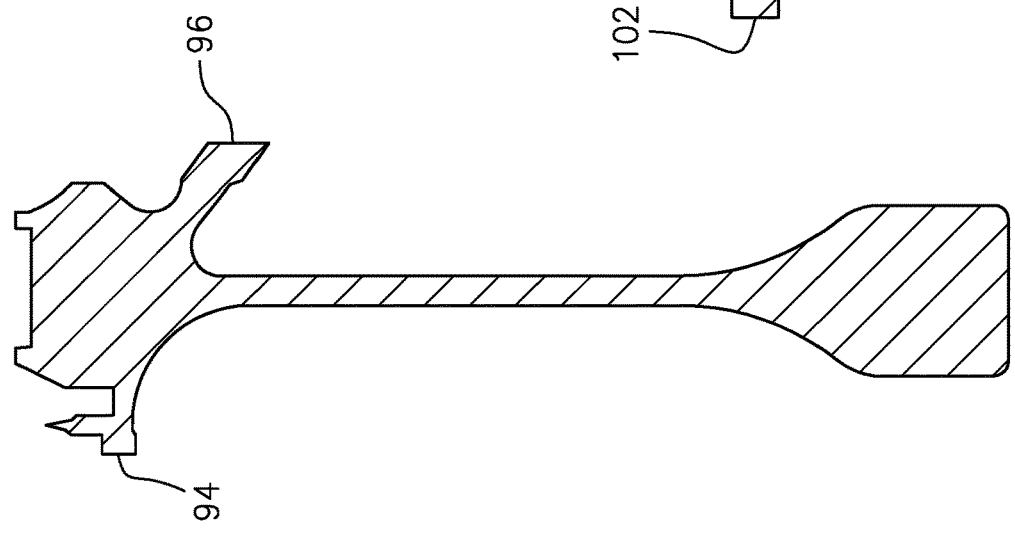
FIG. 3 is a pre-assembly central longitudinal half sectional view of a second disk of the gas turbine engine rotor.

Each of the components extends from an upstream/forward end to a downstream/rear end for mating with associated components. The exemplary upstream end of the first disk 30 is a radial mounting flange 90 (FIG. 2) for bolting to upstream structure. The downstream end 92 is a radial face for welding to the upstream radial face 94 of the second disk (FIG. 3).

Figure 5:
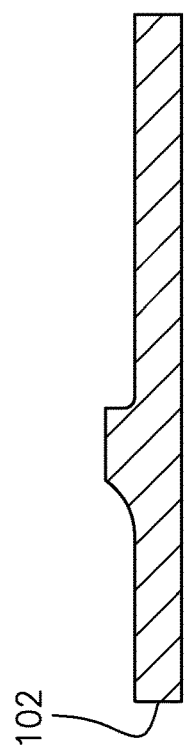
FIG. 5 is a pre-assembly central longitudinal half sectional view of a rear shaft of the gas turbine engine rotor.
Figure 4:
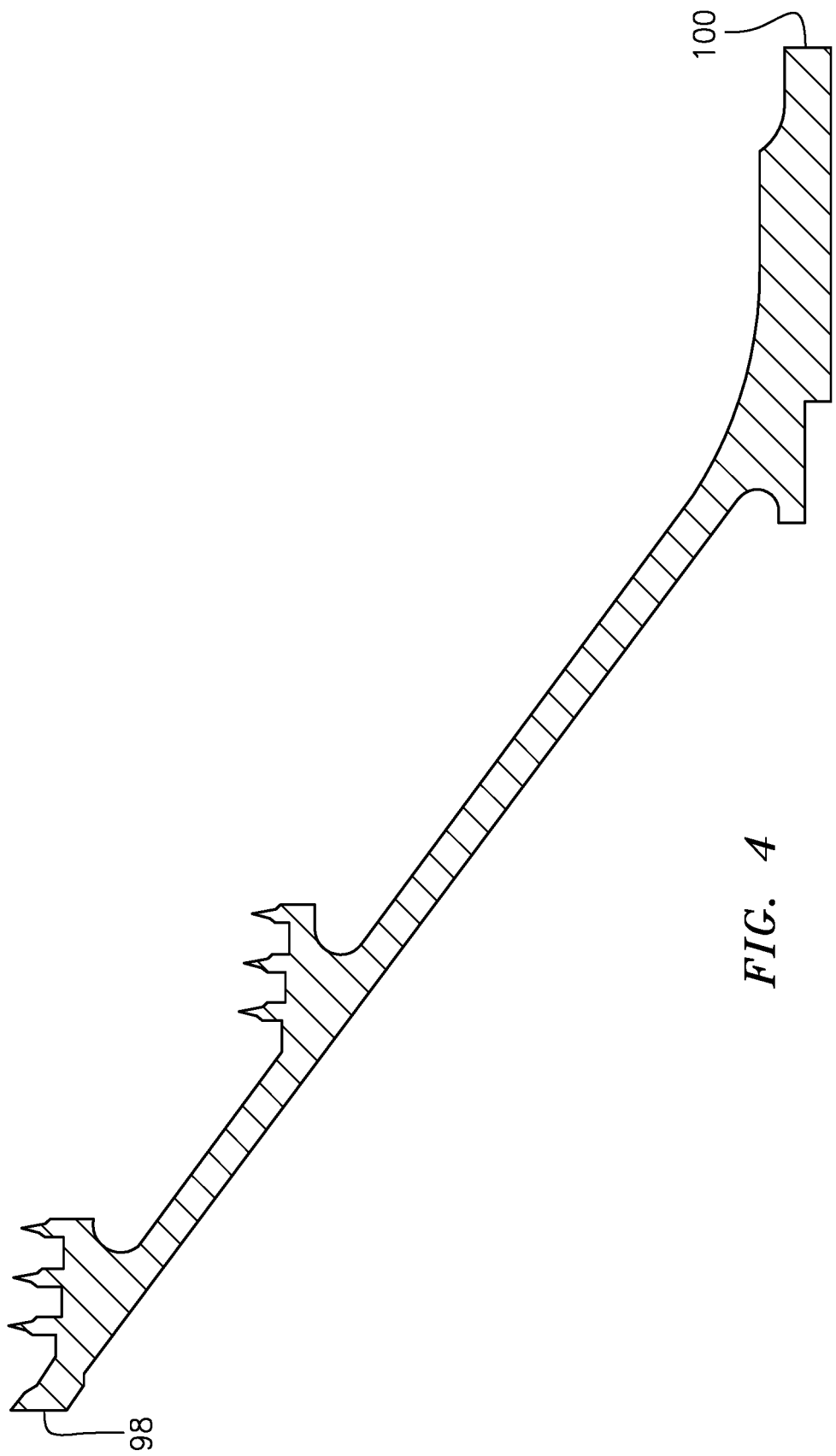
FIG. 4 is a pre-assembly central longitudinal half sectional view of a rear hub of the gas turbine engine rotor.

The second disk downstream end 96 is, similarly, a radial face for mating to an upstream radial face 98 of the hub (FIG. 4). The hub downstream end 100 is a radial face for mounting to an upstream radial face 102 (FIG. 5) of the shaft 36.

As is discussed above, the mating of the four components to each other is via solid state welding, namely rotary friction welding, forming the three welds 40, 42, and 44.

The weldability of coarse grain alloys used in the rotor parts 30, 32, 34, and 36 may be improved by altering the microstructure from coarse grain to fine grain near the surface of the material at the area to be welded (faces 92, 94, 96, 98, 100, and 102). This is particularly relevant to friction welding because friction welding weldability depends on flow stress of the material to be welded. Reduced grain size reduces flow stress at a given temperature. This may allow bonding to occur at a lower temperature than with coarse grain at the interface. Coarse grain alloys more readily exhibit a feature called remnant notch (U.S. Pat. No. 5,111,990) which requires more parent/base material removal during a final machining operation. Fine grain is less likely to exhibit remnant notch thereby improving resulting weld quality post-bonding.

This microstructural alteration is achieved by first heavily working the material local to the surface to be welded. Exemplary working is mechanical roller burnishing. Alternative working is laser shock peening.

Exemplary working and subsequent heat treatment are sufficient to achieve fine grain material of gamma grain size of ASTM 8 or finer, more particularly, ASTM 9 or finer. This may reflect a starting point of gamma grain size of ASTM 8 or coarser, more particularly, 7 or coarser or even 6 or coarser with typical values being about 6 or in the 5 to 7 range.

The working will increase the dislocation density and strain energy in the material near the area to be bonded, enabling recrystallization and grain refinement upon subsequent heat treatment.

Exemplary working may be sufficient to achieve local compressive residual stress of −30 ksi (−207 MPa) or greater magnitude (e.g., greater magnitude than −250 MPa and optionally up to −500 MPa or −1000 MPa) at an exemplary reference depth such as 0.050 inch (1.3 mm) deep from the initial surface (that forms the pre-joining contact surface). Exemplary working may be sufficient to increase the strain energy in the heavily worked region such that the processes of recovery and recrystallization are initiated during heat treatment.

Following this working, thermal heat treatment is used to cause recovery and recrystallization through which the coarse grain microstructure transforms to a fine grain microstructure. Exemplary heat treatment is to approximately 2000° F. (1093° C.) for approximately 0.5 hours followed by air cool. The heat treatment temperature is sufficiently high to enable recrystallization while not being so high as to cause excessive grain growth (e.g., above the desired grain size discussed above). Similarly, the duration is sufficiently long to enable recrystallization while not being so long as to create excessive heat affected zone and/or precipitate coarsening. The air cool is sufficiently quick to limit heat affected zone formation and establish material strength in the ultimate weld while not being so quick as to cause cracking or distortion. The air cool may be to a temperature of ambient/room temperature.

Heat treatment may be overall or may be localized to the area to be welded. One way of localizing is to utilize induction coils around the area of interest to perform the prescribed heat treatment.

Heat treatment temperatures and times can be modified to suit the particular alloy. The fine-grained microstructure formed will aide in the reduction of formation of cracks, liquation, stringers, and porosity by reducing material flow stress during joining and promoting material flow at the bond joint. Fine grain alloys possess much lower flow stresses near the bonding temperatures than their coarse grain counterparts, thereby enabling welding at a lower temperature where higher temperature material degradation risks, such as grain boundary liquation or extremely low hot ductility, are reduced to improve rotary friction weldability.

Exemplary parts to be worked and friction welded may be initially made by an otherwise conventional process. An example below is based on the superalloy forging process of U.S. Pat. No. 4,579,602. Other alloys include those of US Patent Application Publication 20130209265.

Powder is formed by atomization such as from an ingot. The powder is containerized and compacted by hot compaction or hot isostatic pressing.

A billet is manufactured by extruding the compacted powder.

The billet is isothermally forged to a pre-form shape if required.

The billet or pre-form is isothermally forged to a near-net shape.

The near net shape disk precursor is subject to a full heat treatment per material requirements, including solution cycle and any subsequent aging or stress relief cycles.

A machining process (e.g., turning, grinding, and the like) produces the sonic configuration shape (a predetermined precursor configuration that facilitates sonic inspection) of the part.

The part is then subject to sonic inspection for internal, buried flaws. Exemplary techniques include phased array, immersion, contact or other ultrasonic inspection.

A machining process (e.g., turning, grinding, and the like) produces the pre-spin configuration of the part.

A spin operation may involve fixturing the part in a rotary fixture and rotating at high speed so as to radially grow the material. This reduces the radial growth that occurs at first operation.

A machining process (e.g., turning, grinding, and the like) produces the pre-weld configuration of the part.

As discussed above, the weld surfaces are then worked (roller burnished in the example) to refine grain and impart deep local compressive residual stress. High pressure roller burnishing is known to impact deep (>0.060 inch (>1.5 mm)) when cold working. Other means, such as laser shock peening, low plasticity burnishing, etc. can also be used in order to achieve the desired local compressive residual stress level (i.e., magnitude above −30 ksi (−207 MPa) at 0.050 inch (1.3 mm) deep).

The exemplary post-working heat treatment is intentionally localized to the regions cold worked by the burnishing. The cold worked region is heated locally to approximately 2000° F. (1093° C.) as discussed above. The temperature is held for a duration sufficient to establish the desired fine grain recrystallized microstructure Application of local heating can be applied through an induction coil, quartz lamp, resistive heating elements, etc. The application of heat should be highly localized to the region that exceeds the established plastic strain thresholds. The remainder of the part should be maintained at a temperature to prevent gamma prime coarsening, overaging of the grains, etc. This may be achieved by cooling such as forced air cooling.

The friction welding may be performed in sequential stages for each weld. Exemplary friction welding is conventional direct drive and/or inertia assisted rotary friction welding. Alternative friction welding which may be applicable to particular part configurations include linear friction welding (e.g., particularly useful for attaching blades or small bosses or other mounting features), inertial friction welding, friction plug welding, etc. Two adjacent parts may be mounted in the rotary friction welding apparatus and relatively rotated and compressively engaged to fuse. The next weld is then performed by mounting the next part in the apparatus and so forth.

Depending on the depth of the recrystallized fine grain region and the amount of axial upset generated by the bonding process, there is a possibility some of the fine grain region remains present in the as-welded microstructure (e.g., in the heat affected zone (HAZ) or deeper. Weld microstructure will also be fine grained. However the flash (i.e. material expelled as a result of the welding process) may remain continuous, as opposed to particulate-like (as observed in welding coarse grain PM alloys that exhibit grain boundary liquation and grain separation during the expulsion process).

Weld/flash cleanup and inspection/testing may follow each welding or may follow the final welding. Exemplary clean-up involves conventional turning to remove excess weld extrusion and flash to yield net assembly finished surfaces. There may be non-destructive inspection/testing of the weld zone to assure surface and subsurface flaws are acceptable prior to thermal treatment. Exemplary inspection comprises eddy current inspection and ultrasonic inspection for surface and subsurface defects.

Thermal treatment may reduce residual welding stresses. For example, depending on particular geometry, post-welding thermal contraction may impose excessive tensile stresses at the weld. Thermal treatment such as heating and isothermally holding the part at the stabilization temperature for 2 hours and the aging temperature for 8 hours may relieve such stresses.

Finish machining may include: final machining of features such as slots (airfoils for IBR), mounting holes, and the like; final truing of any distortions remaining from the weld or spin process; and various steps to ready the part for coating, etc.

Additional steps may include coating steps.

In a variation, the conventional heat treatment operation may be interrupted in order to weld earlier in the heat treatment cycle (e.g. after solution heat treatment but before stabilization) and to combine the prescribed post weld stress relief heat treatment with completion of the base metal heat treatment. To do this, the machining (at least of the weld surfaces) would also be brought forward in time.

Current technology attempts to weld the coarse grain material as-is, through pre-heating, and through more controlled direct-drive/inertia (hybrid) welding systems. These methods do not alter the microstructure to improve weldability. The recrystallized, fine grain microstructure will improve the weldability of the alloy by decreasing its flow stress. In addition, welding can be performed at lower temperatures and lower input energies, thereby preventing any subsequent degradation to the base material heat affected zone. The working depth of the pre-weld material should be designed such that all of the worked material is either expelled from the weld joint during welding or absorbed into the remaining heat affected zone. Thus, some or all of the altered initial fine grained (FG) microstructure material will be in the flash. If not all in the flash, the altered FG material will be contained in the weld zone (although it would have been heavily worked and should exhibit some change in grain size, most probably finer). Some may even be present in the HAZ or base metal if the amount of axial upset is insufficient to expel the entire refined microstructure material. The altered pre-weld microstructure should not have any negative impact on the finished joint properties because the flash produced during friction welding is removed after the welding process.

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

Where a measure is given in English units followed by a parenthetical containing SI or other units, the parenthetical's units are a conversion and should not imply a degree of precision not found in the English units.

One or more embodiments have been described. Nevertheless, it will be understood that various modifications may be made. For example, when applied to an existing baseline configuration, details of such baseline may influence details of particular implementations. Accordingly, other embodiments are within the scope of the following claims.

What is claimed is:

1. A method for welding a first powder metallurgical (PM) part to a second powder metallurgical (PM) part, the method comprising:
   forming the first PM part and the second PM part by forging;
   machining of a first face of the first PM part and a first face of the second PM part;
   after the machining of the first face of the first PM part, working the first face of the first PM part;
   after the machining of the first face of the second PM part, working the first face of the second PM part; and
   friction welding the first face of the first PM part to the first face of the second PM part,
   wherein:
   the working of the first faces of the first PM part and second PM part comprises working selected from the group consisting of roller burnishing, laser shock peening, and low plasticity burnishing.

2. The method of claim 1 further comprising:
   heat treatment of the first faces of the first PM part and the second PM part after the working of the first faces of the first PM part and the second PM part but before the friction welding to reconstitute the grains in the worked zone.

3. The method of claim 1 wherein:
   the working of the first faces of the first PM part and the second PM part is sufficient to achieve local compressive residual stress of −30 ksi (−207 MPa) or greater magnitude at 0.050 inch (1.3 mm) deep from the first faces of the first PM part and the second PM part.

4. The method of claim 3 further comprising:
   after the working of the first faces of the first PM part and the second PM part but before the friction welding, heat treating at least along the first faces of the first PM part and the second PM part.

5. The method of claim 4 wherein:
   after the heat treating, along the first faces of the first PM part and the second PM part there is gamma grain size of ASTM 9 or finer; and
   before the working of the first faces of the first PM part and the second PM part, along the first faces of the first PM part and the second PM part there is gamma grain size of ASTM 8 or coarser.

6. The method of claim 1 further comprising:
   after the working of the first faces of the first PM part and the second PM part but before the friction welding, heat treating at least along the first faces of the first PM part and the second PM part.

7. The method of claim 6 wherein:
   the heat treating comprises localized heat treatment methods.

8. The method of claim 1 wherein:
   the working of the first faces of the first PM part and second PM part comprises said roller burnishing.

9. The method of claim 1 wherein:
   the first faces of the first PM part and the second part are annular.

10. The method of claim 1 wherein:
    the first PM part and the second PM part are nickel-based superalloy.

11. The method of claim 1 wherein:
    the first PM part and the second PM part are gas turbine engine rotor disks.

12. The method of claim 1 further comprising:
    working a second face of the second PM part;
    working a second face of a third powder metallurgical (PM) part; and
    friction welding the second face of the second PM part to the second face of the third PM part.

13. The method of claim 12 further comprising
    machining of the second faces of the third PM part and the second PM part before the working of the second faces of the first third PM part and the second PM part.

14. The method of claim 13 further comprising:
    after the working of the first faces of the first PM part and the second PM part but before the friction welding, local heat treating along the first faces of the first PM part and the second PM part.

15. The method of claim 10 wherein:
    the first surfaces of the first part and the second part are annular.

16. The method of claim 15 wherein:
    the working of the first faces of the first PM part and the second PM part is sufficient to achieve local compressive residual stress of −30 ksi (−207 MPa) or greater magnitude at 0.050 inch (1.3 mm) deep from the first faces of the first PM part and the second PM part.

17. A method for welding a first powder metallurgical (PM) part to a second powder metallurgical (PM) part, the method comprising:
    forming the first PM part and the second PM part by forging;
    machining of a first face of the first PM part and a first face of the second PM part;
    after the machining of the first face of the first PM part, working the first face of the first PM part;

after the machining of the first face of the second PM part, working the first face of the second PM part; and friction welding the first face of the first PM part to the first face of the second PM part, wherein:

the working of the first faces of the first PM part and the second PM part is sufficient to achieve local compressive residual stress of −30 ksi (−207 MPa) or greater magnitude at 0.050 inch (1.3 mm) deep from the first faces of the first PM part and the second PM part.

18. The method of claim 17 further comprising:

after the working of the first faces of the first PM part and the second PM part but before the friction welding, heat treating at least along the first faces of the first PM part and the second PM part.

19. The method of claim 18 wherein:

after the heat treating, along the first faces of the first PM part and the second PM part there is gamma grain size of ASTM 9 or finer; and before the working of the first faces of the first PM part and the second PM part, along the first faces of the first PM part and the second PM part there is gamma grain size of ASTM 8 or coarser.

\* \* \* \* \*